United States Patent
Manuszak et al.

(10) Patent No.: US 12,427,747 B2
(45) Date of Patent: Sep. 30, 2025

(54) HYBRID PILLOW

(71) Applicant: SEALY TECHNOLOGY, LLC, Trinity, NC (US)

(72) Inventors: Brian M. Manuszak, Thomasville, NC (US); Robbie Hanson, Greensboro, NC (US); James A. Beamon, Jamestown, NC (US); Allen M. Platek, Jamestown, NC (US); Kevin Tar, Summerfield, NC (US)

(73) Assignee: SEALY TECHNOLOGY LLC, Trinity, NC (US)

( * ) Notice: Subject to any disclaimer, the term of this patent is extended or adjusted under 35 U.S.C. 154(b) by 129 days.

(21) Appl. No.: 18/378,980

(22) Filed: Oct. 11, 2023

(65) Prior Publication Data
US 2024/0034024 A1  Feb. 1, 2024

Related U.S. Application Data

(63) Continuation-in-part of application No. 17/849,082, filed on Jun. 24, 2022, now Pat. No. 11,812,881.
(Continued)

(51) Int. Cl.
A47C 27/06    (2006.01)
A47G 9/10    (2006.01)
(Continued)

(52) U.S. Cl.
CPC ............ *B32B 5/245* (2013.01); *A47G 9/10* (2013.01); *B32B 3/04* (2013.01); *B32B 3/18* (2013.01);
(Continued)

(58) Field of Classification Search
CPC ......... A47C 27/20; A47C 27/22; A47C 27/05; A47C 27/15; A47C 27/064; A47C 27/06;
(Continued)

(56) References Cited

U.S. PATENT DOCUMENTS 414,229 A * 11/1889 Lewis ................ A47C 27/05
5/269
1,892,679 A *  1/1933 Penner ............... A47C 31/105
5/722
(Continued)

FOREIGN PATENT DOCUMENTS

KR    101508725 B1    4/2015
WO   2014/147429 A1   9/2014

OTHER PUBLICATIONS

European Patent Office, Extended European Search Report issued in corresponding Application No. EP 22829399 dated Apr. 10, 2025.

*Primary Examiner* — Justin C Mikowski
*Assistant Examiner* — Ifeolu A Adeboyejo
(74) *Attorney, Agent, or Firm* — Stites & Harbison, PLLC; Terry L. Wright

(57) ABSTRACT

A hybrid pillow includes a first coil panel and a second coil panel which are joined along peripheral edges to form an inner shell defining a gap therebetween. The first coil panel is formed of a plurality of coil springs, an upper fabric layer, and a lower fabric layer, with the upper fabric layer and the lower fabric layer joined between the plurality of coil springs and along peripheral edges of the first coil panel. The second coil panel is formed of a second plurality of coil springs, a second upper fabric layer, and a second lower fabric layer, with the second upper fabric layer and the second lower fabric layer joined between the plurality of coil springs and along peripheral edges of the second coil panel. A support material disposed in the gap of the inner shell, and one or more additional layers disposed about the inner shell.

20 Claims, 14 Drawing Sheets

Related U.S. Application Data

(60) Provisional application No. 63/214,505, filed on Jun. 24, 2021.

(51) Int. Cl.
  *B32B 3/04* (2006.01)
  *B32B 3/18* (2006.01)
  *B32B 3/26* (2006.01)
  *B32B 5/02* (2006.01)
  *B32B 5/18* (2006.01)
  *B32B 5/24* (2006.01)

(52) U.S. Cl.
  CPC ............. *B32B 3/266* (2013.01); *B32B 5/028* (2013.01); *B32B 5/18* (2013.01); *A47G 2009/1018* (2013.01); *B32B 2266/0207* (2013.01); *B32B 2266/0278* (2013.01)

(58) Field of Classification Search
  CPC ...... A47C 31/105; A47G 9/10; A47G 9/1009; A47G 2009/1018
  See application file for complete search history.

(56) References Cited

U.S. PATENT DOCUMENTS

| | | | | |
|---|---|---|---|---|
| 3,148,389 | A * | 9/1964 | Lustig | A47C 27/15 5/643 |
| 3,216,028 | A * | 11/1965 | Lawson | A47C 27/12 5/639 |
| 3,394,414 | A * | 7/1968 | Unger | A47C 27/144 5/636 |
| 3,436,771 | A * | 4/1969 | Fisher | A47G 9/0246 5/499 |
| 3,462,779 | A * | 8/1969 | Thompson | A47C 27/063 5/655.8 |
| 3,638,255 | A * | 2/1972 | Sterrett | A47G 9/007 5/636 |
| 3,815,165 | A * | 6/1974 | Tobinick | A47C 27/18 5/915 |
| 6,189,168 | B1 * | 2/2001 | Graebe | A47G 9/1027 5/490 |
| 7,051,389 | B2 * | 5/2006 | Wassilefky | B68G 1/00 5/636 |
| 7,530,127 | B2 * | 5/2009 | Leifermann | A47G 9/1081 5/636 |
| 8,245,339 | B2 * | 8/2012 | Murray | A47G 9/10 5/657 |
| 9,314,118 | B2 * | 4/2016 | Blazar | A47G 9/1027 |
| 2006/0031996 | A1 * | 2/2006 | Rawls-Meehan, Jr. | A47C 27/15 5/724 |
| 2006/0040803 | A1 * | 2/2006 | Perez | A63B 21/00069 482/121 |
| 2018/0078046 | A1 | 3/2018 | Tuton | |
| 2019/0216241 | A1 * | 7/2019 | Codos | A47G 9/10 |
| 2020/0390247 | A1 * | 12/2020 | Taylor | B32B 3/266 |
| 2020/0405069 | A1 * | 12/2020 | Loomis | A47C 27/056 |
| 2023/0115100 | A1 * | 4/2023 | Lim | A47C 27/15 5/636 |

* cited by examiner

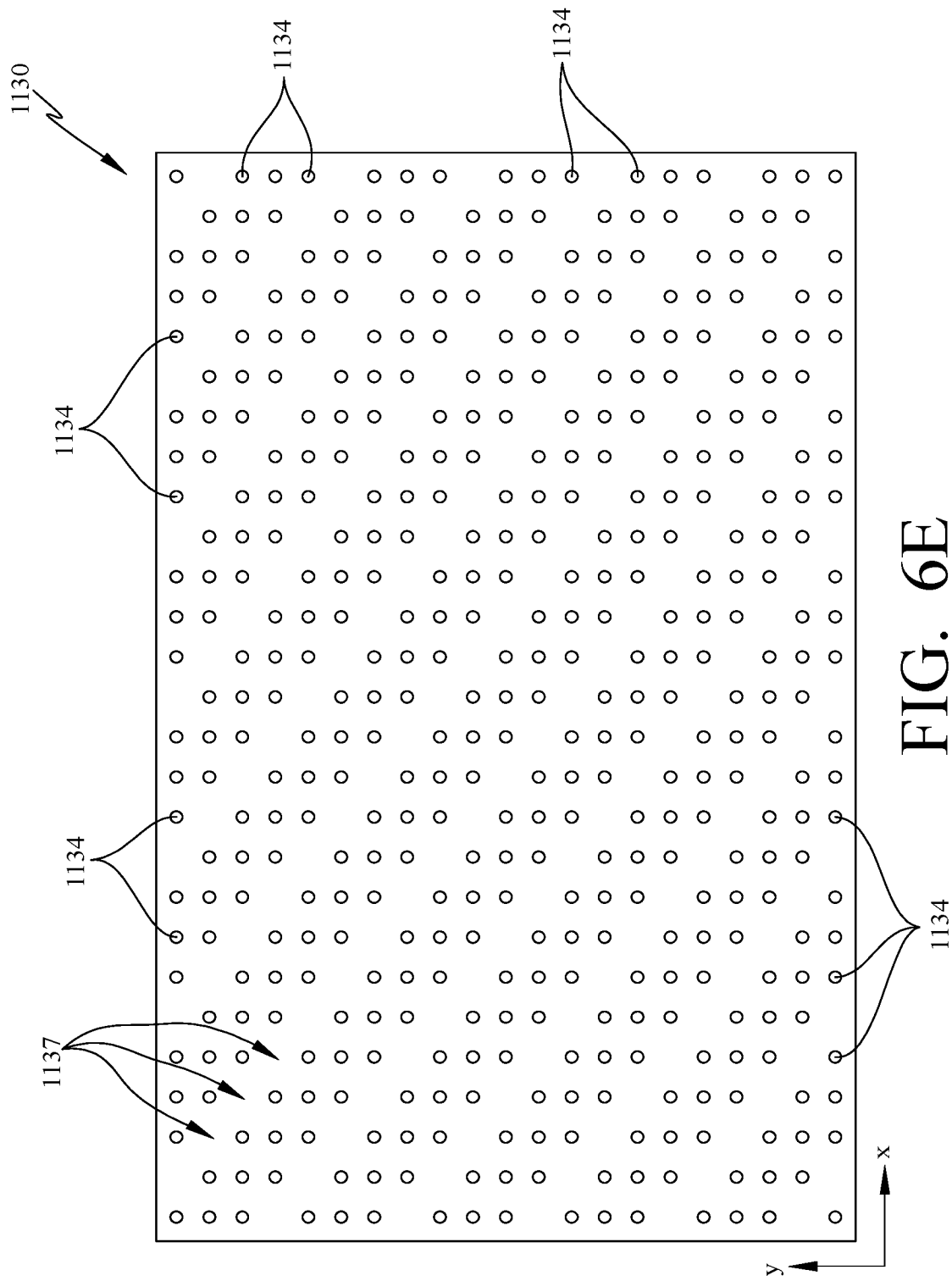

HYBRID PILLOW

RELATED APPLICATIONS

This application is a continuation-in-part application of U.S. patent application Ser. No. 17/849,082, filed Jun. 24, 2022 and which claims priority from U.S. Provisional Application Ser. No. 63/214,505, filed Jun. 24, 2021, the entire disclosures of which are incorporated herein by this reference.

TECHNICAL FIELD

The present invention relates to a hybrid pillow. In particular, the present invention relates to a hybrid pillow that includes coil panels, a foam layer, and an outer shell which can include a cover material or a down-filled fabric.

BACKGROUND

The effectiveness and desirability of a support cushion is partly a function of how comfortable a user is on the support cushion over an extended period of time. In this regard, many users find support cushions, and in particular mattresses, which are made of a flexible foam to be desirable. Over the lifetime of body support cushions, such as mattresses and pillows, however, flexible foams can lose height and firmness. The durability loss of the support cushion can then result in a decline in the comfort of the body support cushion.

Of course, it is desirable that the resilience and comfort of a body support cushion be maintained for as long as possible, and there is a continuous desire to improve the durability, comfort, and resilience of these products. Accordingly, body support cushions that allow for such an improvement in the durability, comfort, and resilience, and which allow such features to be maintained over an extended period of time would be both highly desirable and beneficial.

SUMMARY

The present invention includes a hybrid body support cushion, such as a pillow. In some embodiments, the hybrid pillow comprises various layers including coil panels, a foam layer, and an outer shell which may include a cover material or a down-filled fabric.

In some embodiments of the present invention, a lower first coil panel and an upper second coil panel are joined along a peripheral edge to form an inner shell defining a gap therebetween with a cushioning or support material disposed in the gap.

In some embodiments, an insulator layer is disposed about the inner shell. Likewise, in some embodiments, an outer shell is provided outwardly of the insulator layer.

In some embodiments, the first and second coil panels are each formed of a plurality of coil springs and an upper first fabric layer is arranged over an upper end of each coil spring and a lower second fabric layer is arranged under the lower end of each coil spring. The first and second fabric layers are joined, e.g. welded, between the coil springs, thereby forming a coil pocket. The first and second fabric layers are additionally joined, e.g. welded, along the peripheral edges of the first and second fabric layers to define each of the first coil panel and the second coil panel.

In some embodiments, the first coil panel and/or the second coil panel may define a plurality of airflow apertures to vary the amount of airflow through the coils and the panels.

In some embodiments, in one or both of the coil panels, the coil springs may all have a similar configuration while in other embodiments the configuration of the coil springs may vary across the coil panels. For example, in some embodiments the number and/or location of coils can vary across coil panels. Similarly, in some embodiments, there are different zones in which the configurations of the coils differ. In some instances, these zones may include a soft coil spring zone and firm coil spring zone.

In some embodiments, the support material disposed within the gap defined between the first coil panel and the second coil panel is a viscoelastic foam plate. In other embodiments, the support material is a latex foam plate. Regardless of the particular material, in some embodiments, the foam plate is provided with holes or apertures to allow enhancement of airflow and cooling within the pillow. The number of holes or apertures may vary depending upon the amount of airflow desired and the characteristics of the foam or latex. For example, a thicker foam or a denser foam may have minimal airflow without the apertures, and thus may require more apertures than a thin or less dense foam. In some embodiments, there are a higher density of apertures in a first region as compared to the remainder of the support material.

In some embodiments, the support material includes a netting material which is filled with chipped cushion material, such as chipped foam or chipped latex.

In some embodiments, the outer shell is formed of a first shell material positioned by an outer side of the first coil panel and a second shell material positioned by an outer side of the second coil panel. The first and second shell materials are joined along a periphery of the outer shell to thereby enclose the inner shell, but in some embodiments the outer shell may be open along one side, multiple sides, or entirely unjoined.

In some embodiments, each of the first and second shell materials are foam panels. The upper shell material and lower shell material may be of the same type of foam but may have different thicknesses or characteristics to provide the different feel for the pillow sides.

In some embodiments, the outer shell is made of down-filled fabric shells which include a down-proof material on an interior surface thereof and may be sealed closed or may include a closure to allow removal of the down.

In some embodiments, a cover is disposed about the outer shell. In some exemplary embodiments, the cover is made of a fabric and may be quilted and/or may include various designs, including but not limited to labels for a "firm" or "soft" side. The cover may also include phase change material in some embodiments in order to enhance cooling feel to the user. If desirable, it is contemplated that a pillow case, typically formed of a thin fabric may be placed over the cover. Some exemplary covers are closed about the peripheral edge and include a closure to access the interior of the pillow or alternatively, remove the internal contents for washing of the cover when desired. The closure may extend along one or more sides of the pillow to ease placement of the layers therein.

Further features and advantages of the present invention will become evident to those of ordinary skill in the art after a study of the description, figures, and non-limiting examples in this document.

BRIEF DESCRIPTION OF THE DRAWINGS

FIG. 6E is a schematic layer view of another exemplary coil pattern for use in a coil panel;

DESCRIPTION OF EXEMPLARY EMBODIMENTS

The present invention includes a hybrid body support cushion, such as a pillow. In some embodiments, the hybrid pillow comprises various layers including foam and coil springs, with additional layers or structures to provide a desired feel for an end user, such as a firmer or softer feel or other characteristics. The varying layers may be tuned by way of adjustment of various characteristics to a user's desire. For non-limiting example, some users may want a thin pillow and others may want a thicker pillow. Still further some users may prefer a firmer feel while others may prefer a softer feel. All of these characteristics, and others, can be "tuned" or varied to provide a most preferred pillow feel for the end user.

Figure 1:
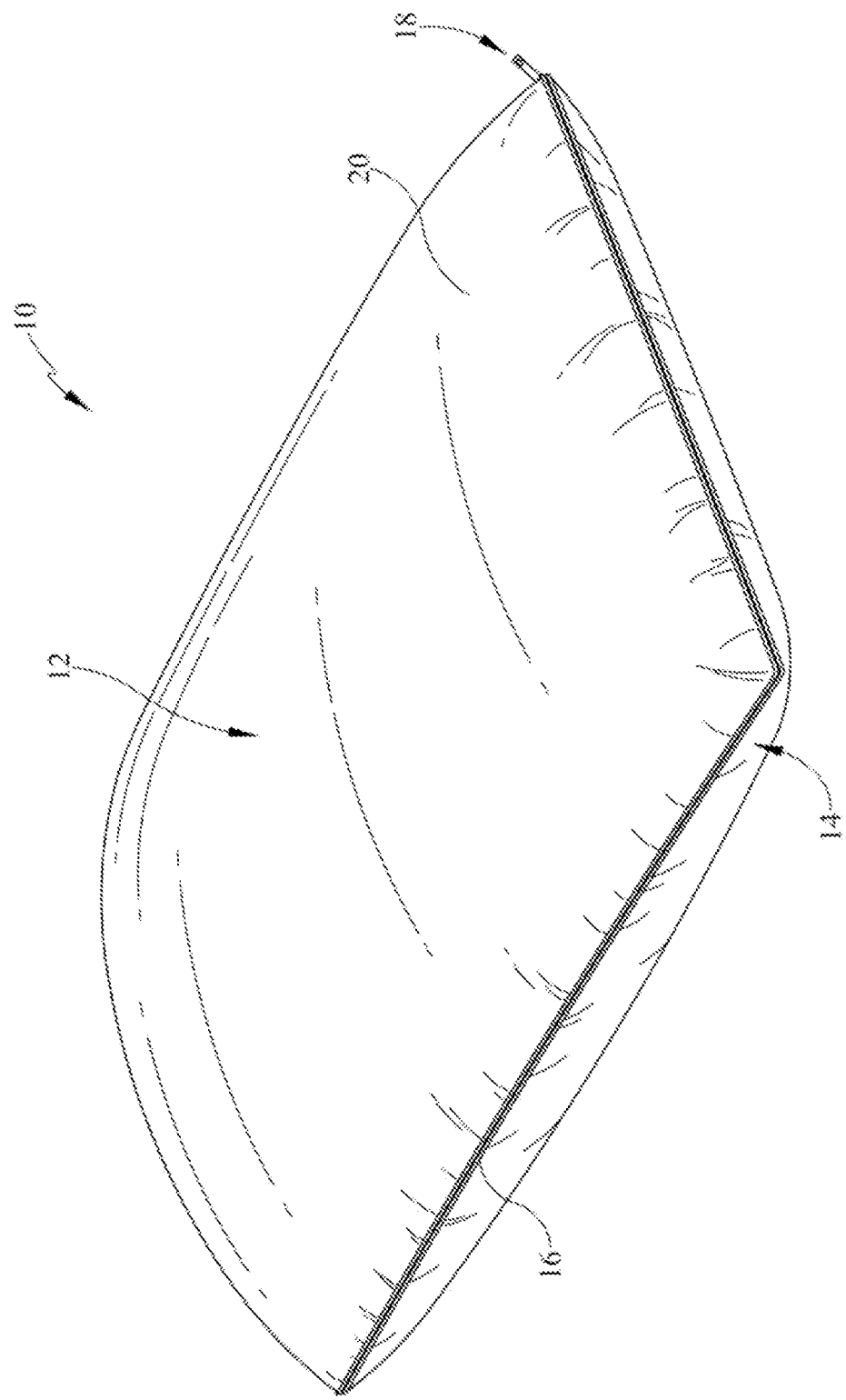
FIG. 1 is a perspective view of an exemplary hybrid pillow made in accordance with the present invention.

Referring first to FIG. 1, a perspective view of an exemplary body support cushion 10 is provided and for purpose of the instant teaching, and ease of reference, the body support cushion 10 is also referred to as a pillow, or hybrid pillow. However, a body support cushion made in accordance with the present invention may be embodied in various structures which support one or more portions of an end user's body. The term body support cushion may include, for non-limiting example, various types of supports including bedding and/or cushions for chairs and furniture, pillows, padding for medical devices and equipment (e.g., wheelchair seat pads, wheelchair padding, medical pads, hospital gurney pads, operating table pads, positioning pads), padding for furniture (e.g., upholstery padding, furniture cushions, furniture pads), padding for athletic equipment and devices (e.g., athletic cushions, sports and athletic padding, gymnastic mats), padding for recreational equipment and devices (e.g., camping and sleeping mats), padding for apparel (e.g., bra straps, shoulder pads, shoe linings, boot linings), padding for household goods (e.g., anti-fatigue mats, mattress pads, mattress covers, mattress "toppers," the pillow-top portion of pillow-top mattresses, pillows, and the like); padding accessories (e.g., briefcase shoulder straps, computer carrying cases, purses, gloves, and the like), pet beds, and the like. Thus any of these types of structures, and others, may fall within the scope of the term pillow or body support cushion, which are used interchangeably.

Referring still to FIG. 1, the exemplary hybrid pillow 10 has a generally rectangular peripheral shape with an arcuate upper surface 12 and actuate lower surface 14 that are joined by arcuate curves at or around the peripheral edges 16 of the pillow 10. The pillow 10 also includes a cover 20 with at least one closure 18 along one or more sides thereof. The closure 18 may be of various types including but not limited to zippers, buttons, snaps, and hook and loop fasteners. The closure 18 allows the cover 20 of the pillow 10 to be opened, for example, to change the internal components if a user desires to change characteristics of the pillow (e.g. to tailor the pillow for a back, side, or stomach sleeper). Also, with removal of the internal components, the cover 20 may be periodically washed.

Exemplary pillows may be arcuate in one or both longitudinal (long) and latitudinal (short) dimensions. Likewise, exemplary pillows may have a generally flat upper and/or lower surface which are joined by straight or arcuate curves at or around a peripheral edge of the pillow 10, or alternatively the upper and/or lower surfaces may be entirely arcuate. As used herein, a "peripheral edge" may be one or more edges which define the shape of the pillow 10. Exemplary pillows may also have various shapes other than the rectangular shape shown and therefore, the shape should not be considered limiting.

Figures 2, 2A:
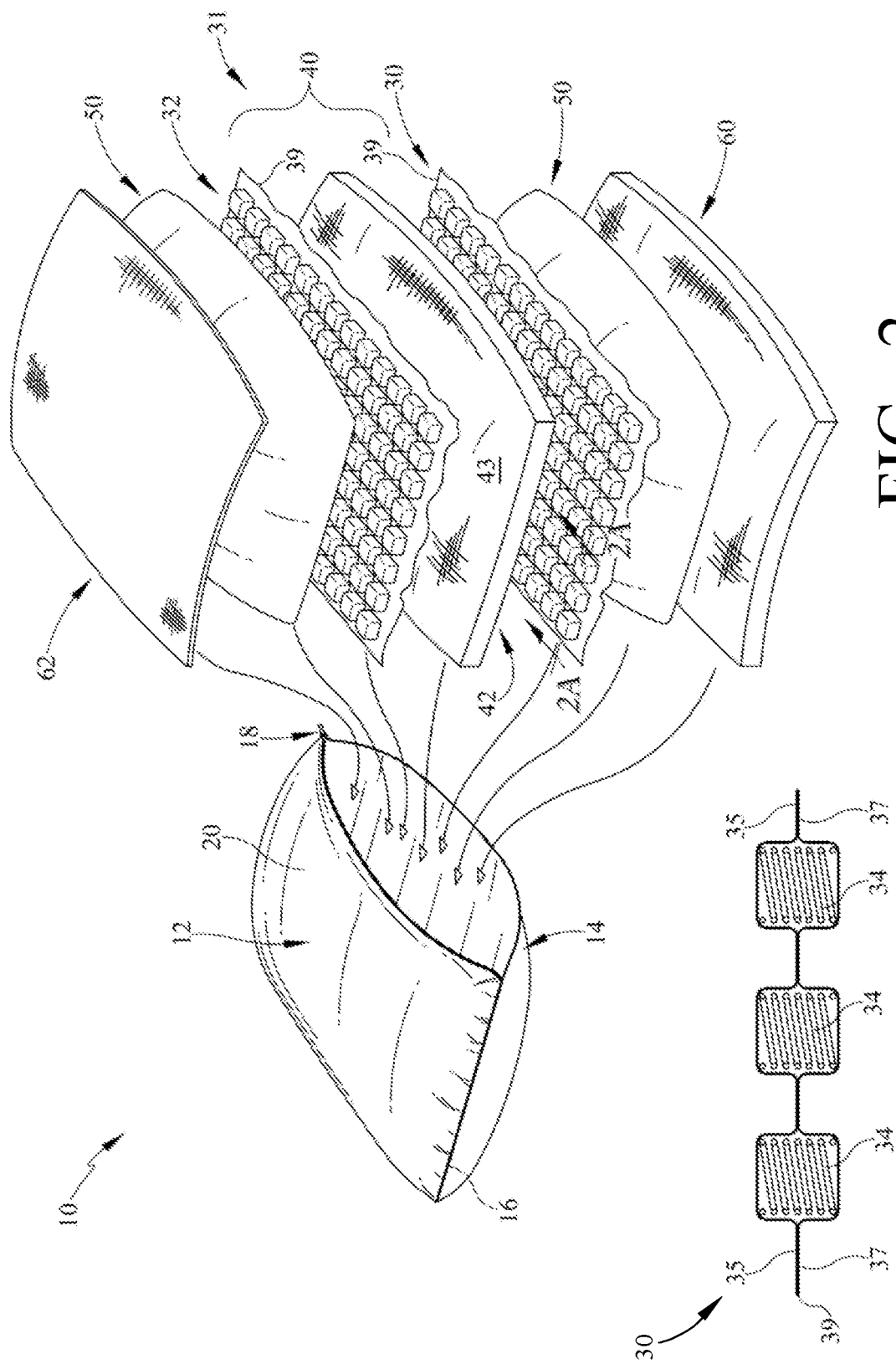
FIG. 2 is an exploded perspective view of the hybrid pillow of FIG. 1.
FIG. 2A is a section detail of a coil panel.

Referring now to FIGS. 2-2A, the exemplary hybrid pillow 10 includes multiple layers that provide certain characteristics, as discussed below. Specifically, the exemplary pillow 10 shown in FIGS. 2-2A includes a lower first coil panel 30 and an upper second coil panel 32 which are joined along a peripheral edge 39 of the first and second coil panels 30, 32 to form an inner shell 31 defining a gap 40 between the first and second coil panels 30, 32. In the exemplary hybrid pillow 10, a cushioning or support material 42 is disposed in the gap 40, but in other embodiments, the support material 42 may be omitted or replaced with another material without departing from the spirit and scope of the present invention. The first and second coil panels 30, 32 may be joined together by ultrasonic welding (i.e., welding), sewing, and/or other forms of fastening to form the inner shell 31. The joined first and second coil panels 30, 32, or otherwise inner shell 31, may be completely closed around the entire periphery, or in some embodiments may be provided as open along one side. The opening may include a closure (not shown) of various types including but not limited to zippers, buttons, snaps, and hook and loop fasteners. The opening may allow for positioning of the support material 42 therein and, if desirable, removal of the support material 42 at a later time.

As shown in FIG. 2, an insulator layer 50 is disposed about the inner shell 31. That is to say, there is an insulator layer 50 extending along an outside surface of the first coil panel 30 and another insulator layer 50 extending along an outside surface of the second coil panel 32. In other embodiments, however, an insulator layer may only be disposed over an outside surface of only one of the first coil panel 30 or the second coil panel 32, or the insulator layer may be omitted entirely. Also shown outwardly of the insulator layer 50 is an outer shell 60, 62, and likewise outwardly of the outer shell 60, 62 is a cover 20, which are each discussed further below.

Referring still to FIGS. 2-2A, but now focusing on the first and second coil panels 30, 32 of the exemplary pillow 10, each of the first and second coil panels 30, 32 is formed of a plurality of coil springs 34 (shown in FIG. 2A) which are laid out in an array or matrix of rows and/or columns. In the embodiment shown in FIGS. 2-2A, the plurality of coil springs 34 are arranged in rows and columns, but other configurations are also contemplated. For example, rather than the plurality of coil springs aligned in two perpendicular dimensions, as shown in FIG. 2, the plurality of coil springs may be aligned in one dimension and offset in another dimension. The number of coil springs per row and column may also vary. Likewise, the size of the matrix may also vary depending on the size of the first and second coil panels 30, 32.

As shown in FIG. 2A, the exemplary first coil panel 30 includes an upper first fabric layer 35 arranged over an upper end of each coil spring 34 and a lower second fabric layer 37 arranged under the lower end of each coil spring 34. The first and second fabric layers 35, 37 are joined, e.g. welded, between the coil springs 34, thereby forming a coil pocket. The first and second fabric layers are additionally joined, e.g. welded, along the peripheral edges 39 of the first and second fabric layers 35, 37 to define each of the first coil panel 30 and the second coil panel 32. The space illustrated in FIG. 2A between the coil springs 34 is illustrative of the weld between the first and second fabric layers 35, 37, and is not intended to be limiting. For example, in some embodiments, a weld joining the first and second fabric layers 35, 37 may have a width of about 3 mm to about 5 mm. Likewise, the size of the coil pocket formed by the first and second fabric layers 35, 37 may vary based on the size of the coil spring contained therein. Although not expressly shown, the second coil panel 32 is similarly constructed with an upper first fabric layer and a lower second fabric layer joined between a plurality of coil springs to form coil pockets around the plurality of coil springs and along peripheral edges of the first and second fabric layer.

The first and second fabric layers 35, 37 may be made of various materials. Non-limiting examples of materials include non-wovens, warp knits, nylon, rayon, polyester, spacer fabric, or the like. This list however is non-exhaustive. As an example, where a nonwoven fabric is used, it may be desirable for the non-woven fabric to be free of various defects including, but not limited to, shavings, scabs, holes, and/or scraps. Additionally, in some such instances, where a non-woven may be used, the non-woven fabric may have a weight between about 40 g/m² and about 80 g/m². In other instances, the first and second fabric layers 35, 37 may be made of different materials. For example, the first fabric layer 35 may be a spun lace mesh fabric (for example, with a weight of about 70 g/m2), while the second fabric layer 37 may be a non-woven as described previously.

In some embodiments, the material of the first and second fabric layers may limit air permeability so that when the first and second coil panels 30, 32 are compressed the air cannot readily escape. Likewise, when the compression force on the pillow is released, the expansion of the first and second coil panels 30, 32 may occur slowly due to the slow pull of air through the first and second fabric layers 35, 37. In some other embodiments, the material of the first and second fabric layers may be air impermeable with air permeable portions located at specific locations. By controlling the size, numbers and/or locations of the air permeable locations, the air flow into and out of the fabrics and first and second coil panels 30, 32 may also be controlled.

Figure 5C:
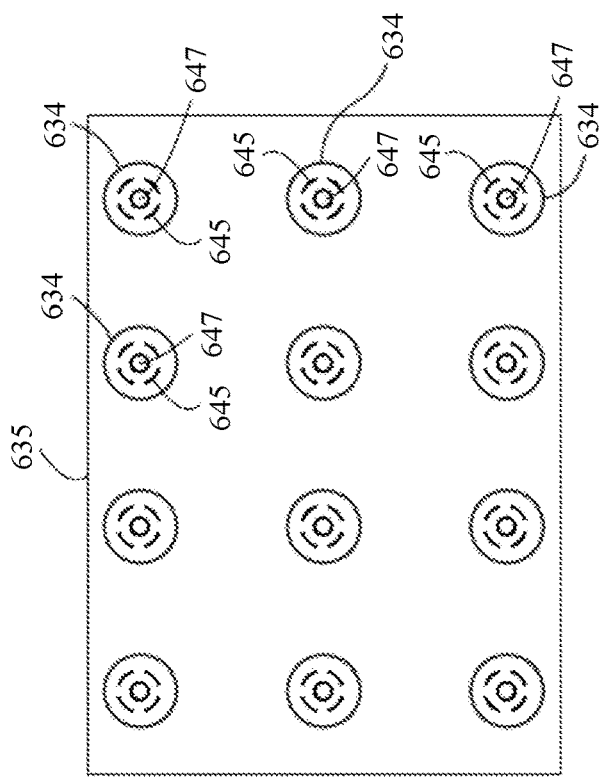
FIG. 5C is a top view of a third exemplary fabric layer for use in a coil panel that defines a plurality of apertures within a central welded portion.
Figure 5A:
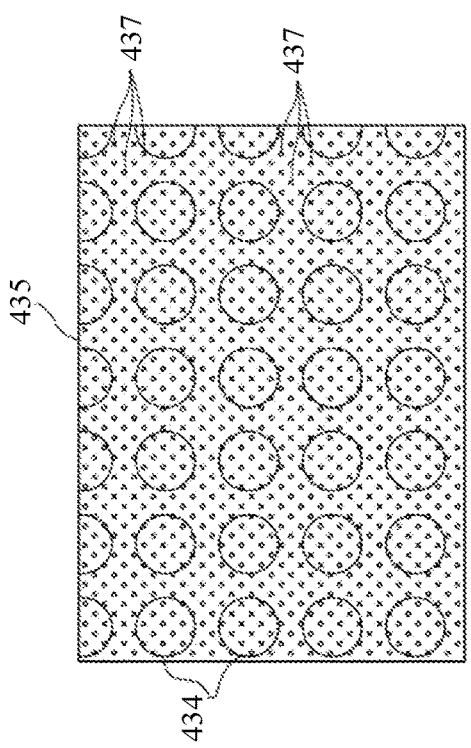
FIG. 5A is a top view of one exemplary fabric layer for use in a coil panel that defines a plurality of apertures in a first pattern.
Figure 5B:
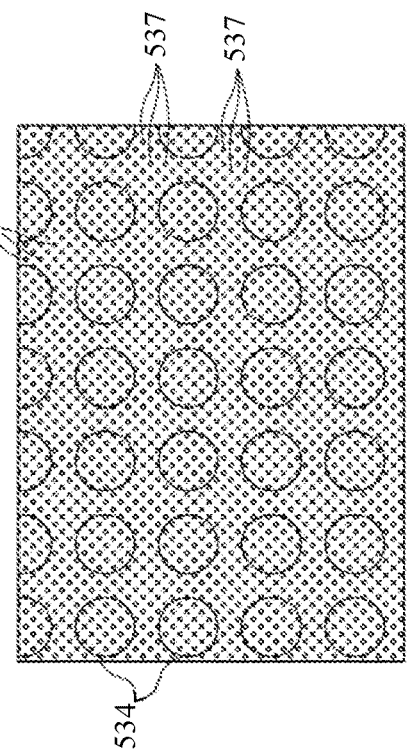
FIG. 5B is a top view of a second exemplary fabric layer for use in a coil panel that defines a plurality of apertures in a second denser pattern.

For example, and referring now to FIGS. 5A-5C, according to some exemplary embodiments, the first coil panel and/or the second coil panel may define a plurality of airflow apertures to vary the amount of airflow through the coils and the panels. More specifically, in some embodiments the first and/or second fabric layers may have varying densities of apertures to improve the airflow through each panel. In FIG. 5A an exemplary first fabric layer 435 arranged over a plurality of coil springs 434 defines a number of apertures 437 per square inch and by comparison in FIG. 5B another exemplary first fabric layer 535 arranged over a plurality of coil springs 534 defines a greater number of apertures 537 per square inch. Thus the aperture size and density may vary in order to vary air flow through the device.

FIG. 5C illustrates another exemplary first fabric layer 635 with an alternative pattern of apertures. In this illustrated embodiment, in addition to welding the first fabric layer 635 to a second fabric layer (not show) between the coil springs 634, the first fabric layer 635 is additionally welded to the second fabric layer in a center portion of the coil springs 634 to form a central welded portion 645 within each of the coil springs 634. As shown in FIG. 5C, an aperture 647 is then defined within these central welded portions 645 to allow for airflow. As a non-limited example, the central welded portion 645 has a diameter of about 21 mm to about 25 mm and the aperture 647 has a diameter of about 9 mm to about 10 mm. Although the above descriptions of FIGS. 5A-5C are directed towards a first fabric layer, it should be understood that the second fabric layer can likewise include apertures instead of, or in addition to, the first fabric layer within one or more of the first and second coil panels of the present invention.

Returning again to FIGS. 2 and 2A, but focusing now on the plurality of coil springs 34 of the first and second coil panels 30, 32, the number of coils per square foot for the exemplary first and second coil panels 30, 32 may be in the range of about 14 to about 250. The coil springs 34 may be of various sizes and number within the first and second coil panels 30, 32. In some non-limiting embodiments, for example, the coil springs may be up to about 3 inches in diameter and up to about 3 inches tall in a compressed height. The springs may have an un-loaded height, and may also have a loaded height, which is shorter than the un-loaded, fully relaxed height. As a non-limiting example, coil mini springs may be used which have an un-loaded or coil free height of about 20 mm to about 26 mm, and a loaded or compressed height of about 18 mm to about 20 mm. Alternatively, as a second non-limiting example, larger coils may be used which have an un-loaded or coil free height of about 90 mm to about 110 mm, and a loaded or compressed height of about 27.5 mm to about 32.5 mm. The coil springs may be, in some instances, constructed of a 17.5 gauge wire (e.g. a wire with a diameter of about 1.25 mm) or a 19.5 gauge wire. The coil springs may have consistent wire size (diameter) or the wire size may vary across the coil spring. The coil springs may, in some instances, be turned approximately three and three-quarter (plus or minus a quarter turns) times to construct the coil. When constructed, each end of the wire forming the coil may be inside the coil spring structure. Coil springs may be various shapes, for example may be barrel, cylindrical or hourglass in shape. Pitches and diameters may be symmetrical or non-symmetrical which allows the coil springs to have either a linear or non-linear response when compressed. However, other sizes, shapes, and variations may be utilized. For example, the coil spring may be a coil-in-coil design, wherein one or both coils may vary in diameter—for example a conical design. Still further combinations of coil types may be utilized.

The coil springs 34 may be loaded by way of engagement and joining of the first and second fabric layers 35, 37. As mentioned previously, in some instances, the coil springs 34 may be preloaded to a height of about 18 mm to about 20 mm, thereby providing a coil pocket height of about the same. Additionally, the coil springs 34 may be preloaded to about 0.09 pound-force to about 0.8 pound-force, and further have a compression at 0.5 inches of about 0.45 pound force to about 1.85 pound force. In some embodiments, the first coil panel 30 and/or the second coil panel 34 and the insulator layers 50 are joined together with a tuft and cord mechanical fastening method wherein the length of the cord can be adjusted during the manufacturing process to increase or decrease the preload applied to the internal components to create an increased or decreased firmness of the pillow while also preventing shifting of the materials internal to the pillow 10. For instance, in some embodiments, the length of cord used in the fastening method is made longer to create a softer pillow or shorter to create more compression and, in turn, a firmer pillow.

According to some exemplary embodiments, in one or both of the coil panels, the coil springs may all have a similar configuration or in other embodiments the configuration of the coil springs may vary across the coil panels. Likewise, the density of the coil springs may vary across the coil panels. Furthermore, the coil springs may vary in spring constant. That is, the coil springs may have a spring constant of about 0.3 lbs/in to about 3.0 lbs/in. Also, the spring constant may be the same or the same range across coil panels, or alternatively may vary in range, or vary by location. Accordingly, an exemplary pillow may have a more firm area and a less firm area. Likewise, an exemplary pillow may have an upper surface with one or more coil characteristics based on the underlying upper coil panel and may have a lower surface with the same or different set of coil characteristics based on the underlying lower coil panel. Thus, an exemplary pillow made in accordance with the present invention may have one feel on one side of the pillow and a different feel on a second side of the pillow.

With brief additional reference to FIGS. 6A-6H, various schematic views are provided illustrating various patterns of coils for use within coil panels of the present invention. Each view shows another exemplary coil panel 730, 830, 930, 1030, 1130, 1230, 1330, 1430 which can be used as the first coil panel 30, the second coil panel 32, or both the first and second coil panels 30, 32 of the exemplary pillow 10. As shown in FIGS. 6A-6H, the coil panels 730, 830, 930, 1030, 1130, 1230, 1330, 1430 may have various patterns of coils, which are represented with circles in the Figures.

Figure 6A:
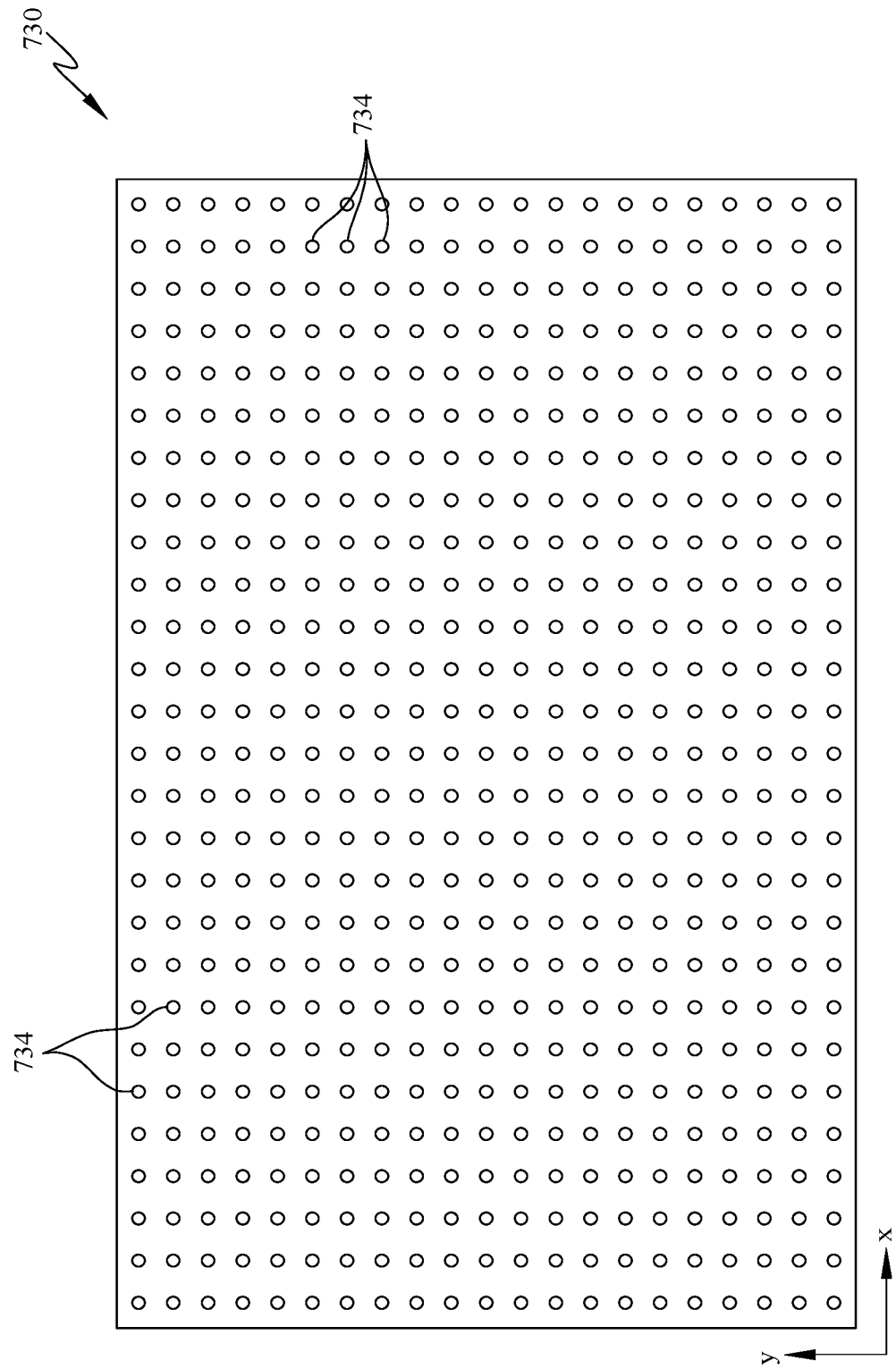
FIG. 6A is a schematic layer view of one exemplary coil pattern for use in a coil panel.
Figure 6B:
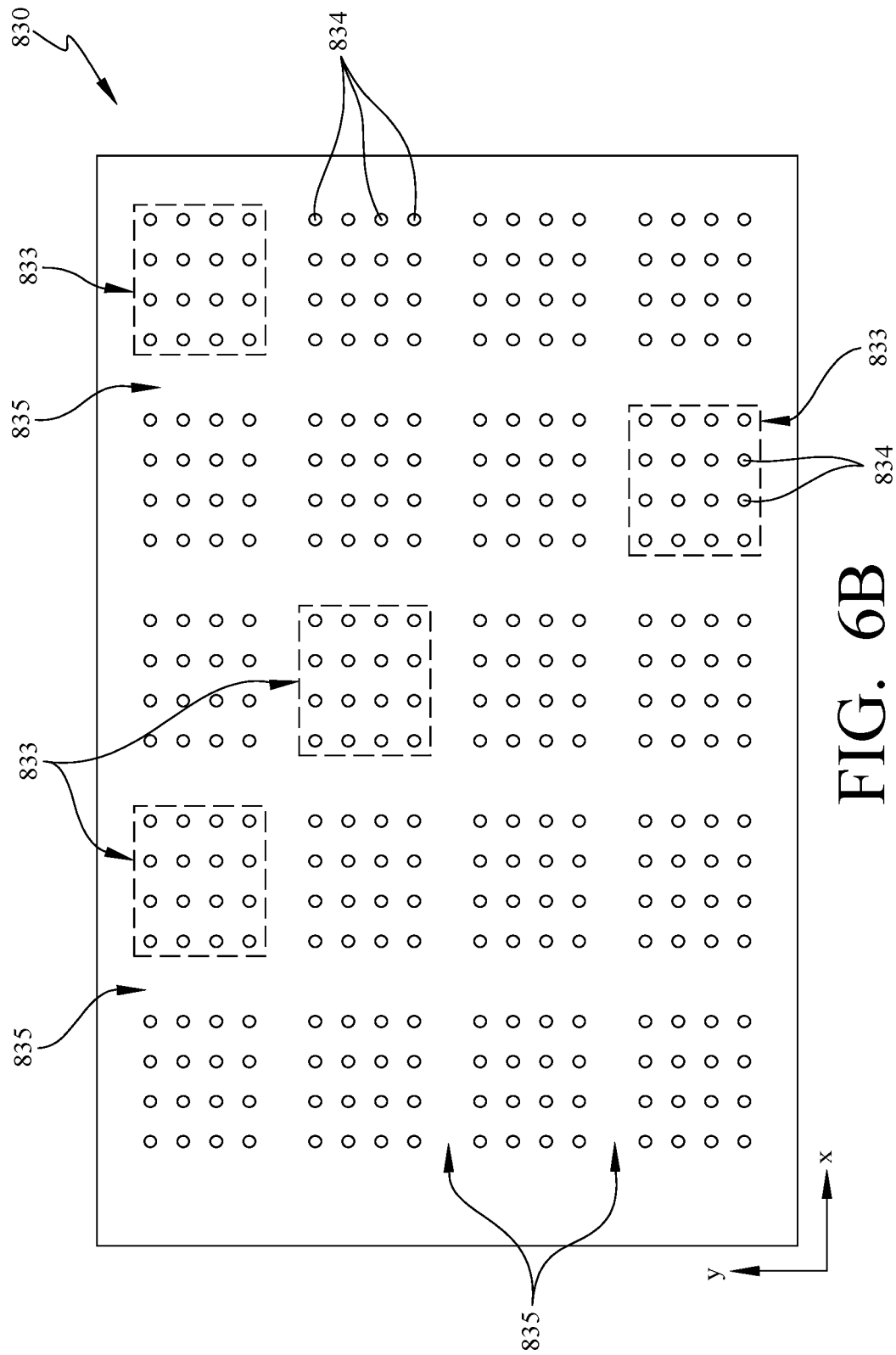
FIG. 6B is a schematic layer view of another exemplary coil pattern for use in a coil panel.
Figure 6C:
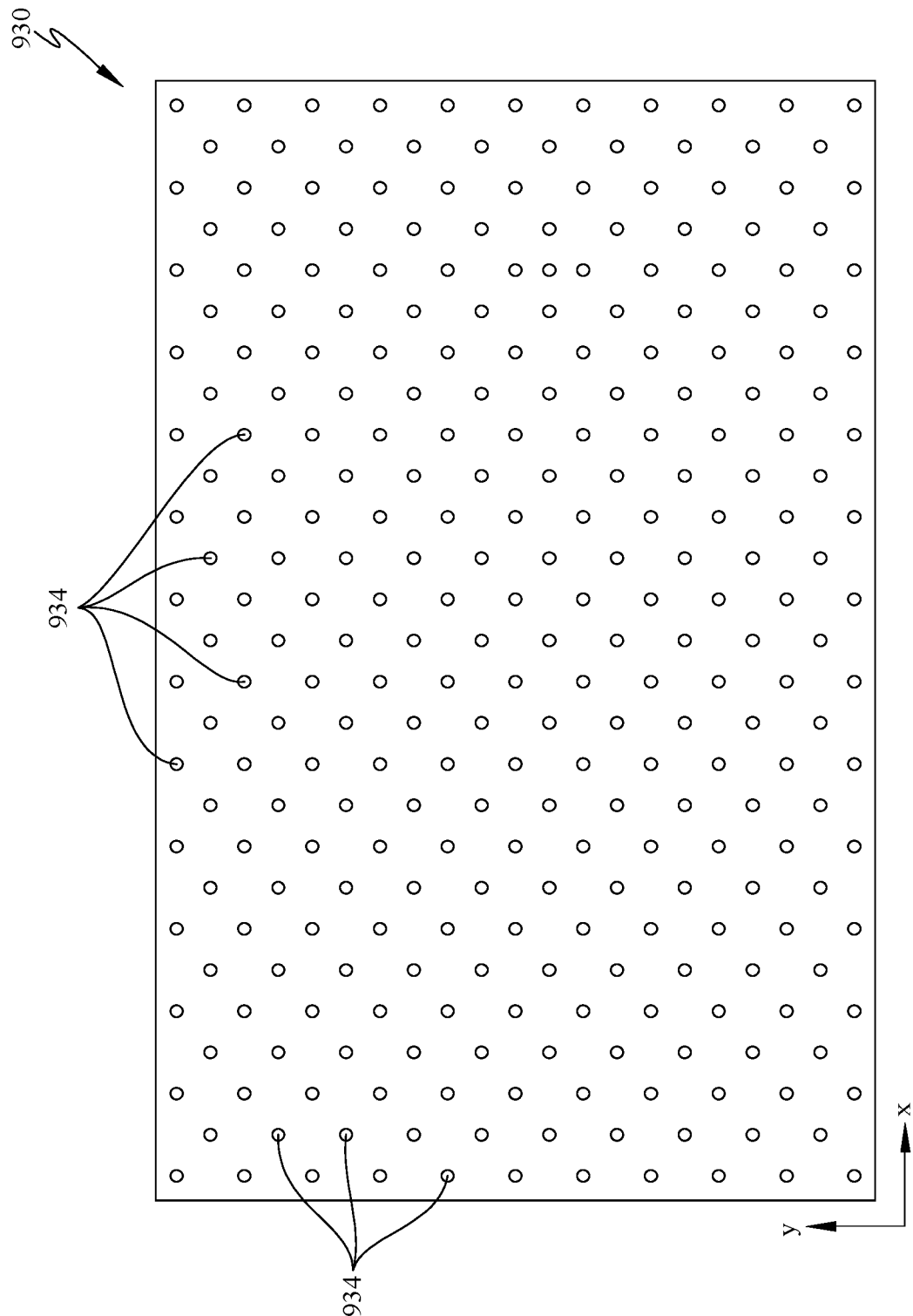
FIG. 6C is a schematic layer view of another exemplary coil pattern for use in a coil panel.
Figure 6D:
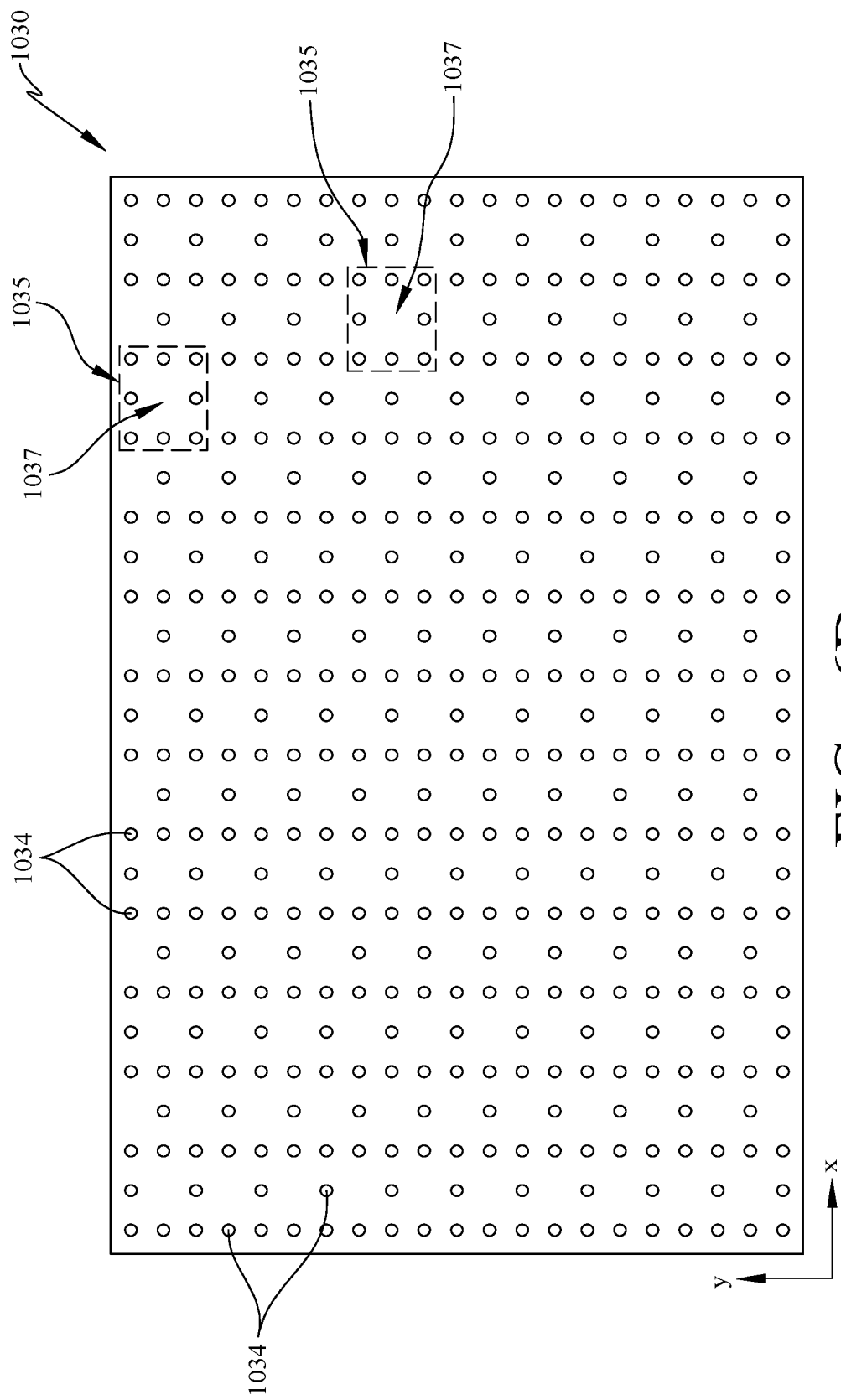
FIG. 6D is a schematic layer view of another exemplary coil pattern for use in a coil panel.

According to some embodiments, as depicted in FIGS. 6A-6E the number and/or location of coils can vary across coil panels. With reference first to FIG. 6A, the exemplary coil panel 730 includes coils 734 that form stripes in both of x and y coordinate directions (i.e., rows and columns). These rows and columns may correspond to the head to toe and/or side to side directions. With reference to FIG. 6B, the exemplary coil panel 830 includes coils 834 that are arranged in groups 833 with channels 835 defined between the groups 833 and extending in the x and/or y directions. In the exemplary coil panel 830, the groups 833 are substantially square, but may be defined by various shapes, and in some examples may be rectangular, circular, or any other desirable shape. With reference to FIG. 6C, the exemplary coil panel 930 includes coils 934 that are arranged in a checkerboard arrangement. With reference to FIG. 6D, the exemplary coil panel 1030 includes coils 1034 that are arranged in patterns, for example squares 1035 with a hollow area 1037 in the center of the square 1035 in which there is no coil. Of course, other shapes may be used other than the squares 1035. With reference to FIG. 6E, the exemplary coil panel 1130 includes coils 1134 that are arranged in patterns wherein a coil is removed in every $n^{th}$ location 1137. For example, in the exemplary coil panel 1130, every third coil is removed along each row with a one coil offset between coils. However, in other embodiments, the coil may be removed at other frequencies and in either or both of the x direction or the y direction.

Figure 6F:
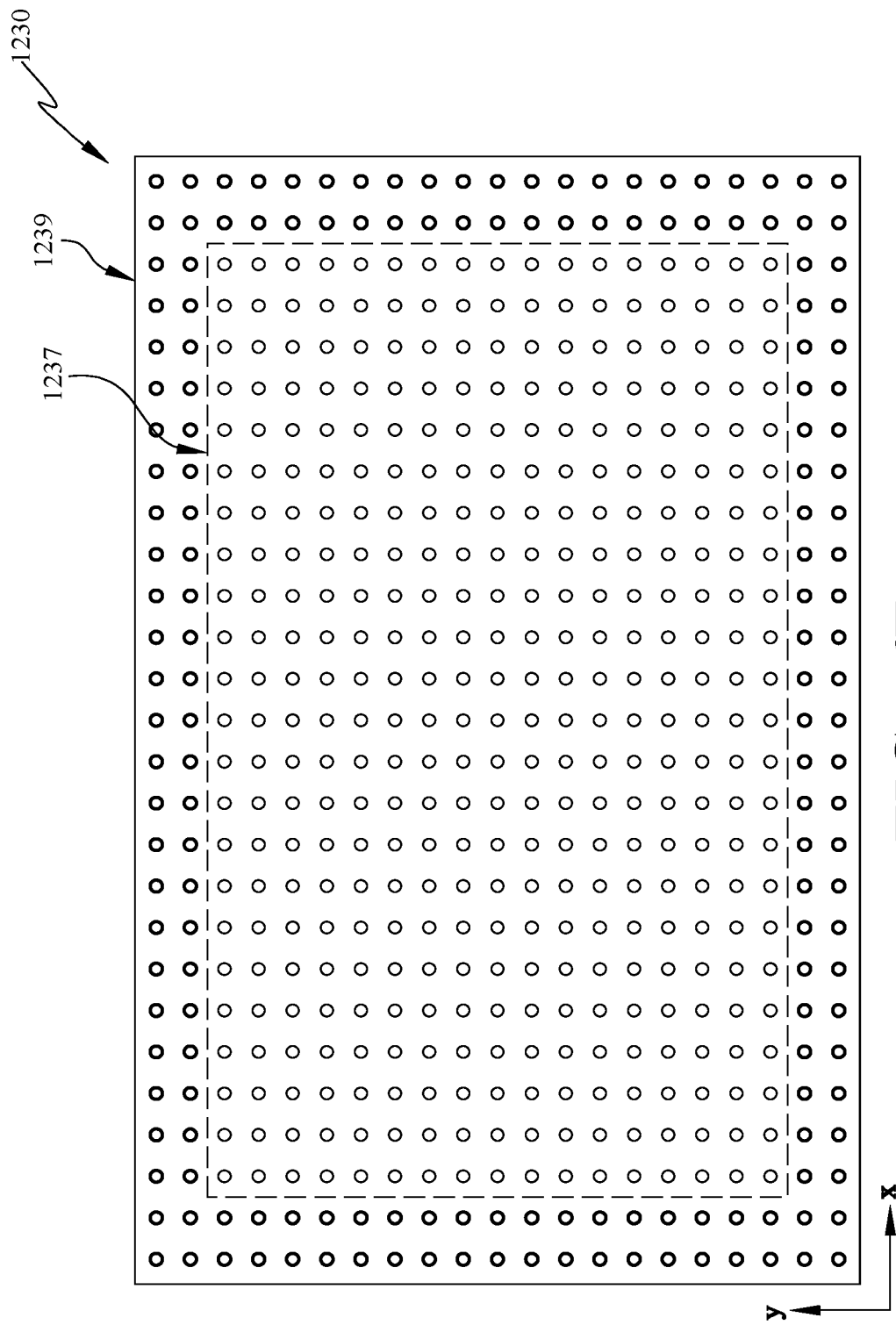
FIG. 6F is a schematic layer view of another exemplary coil pattern for use in a coil panel.
Figure 6G:
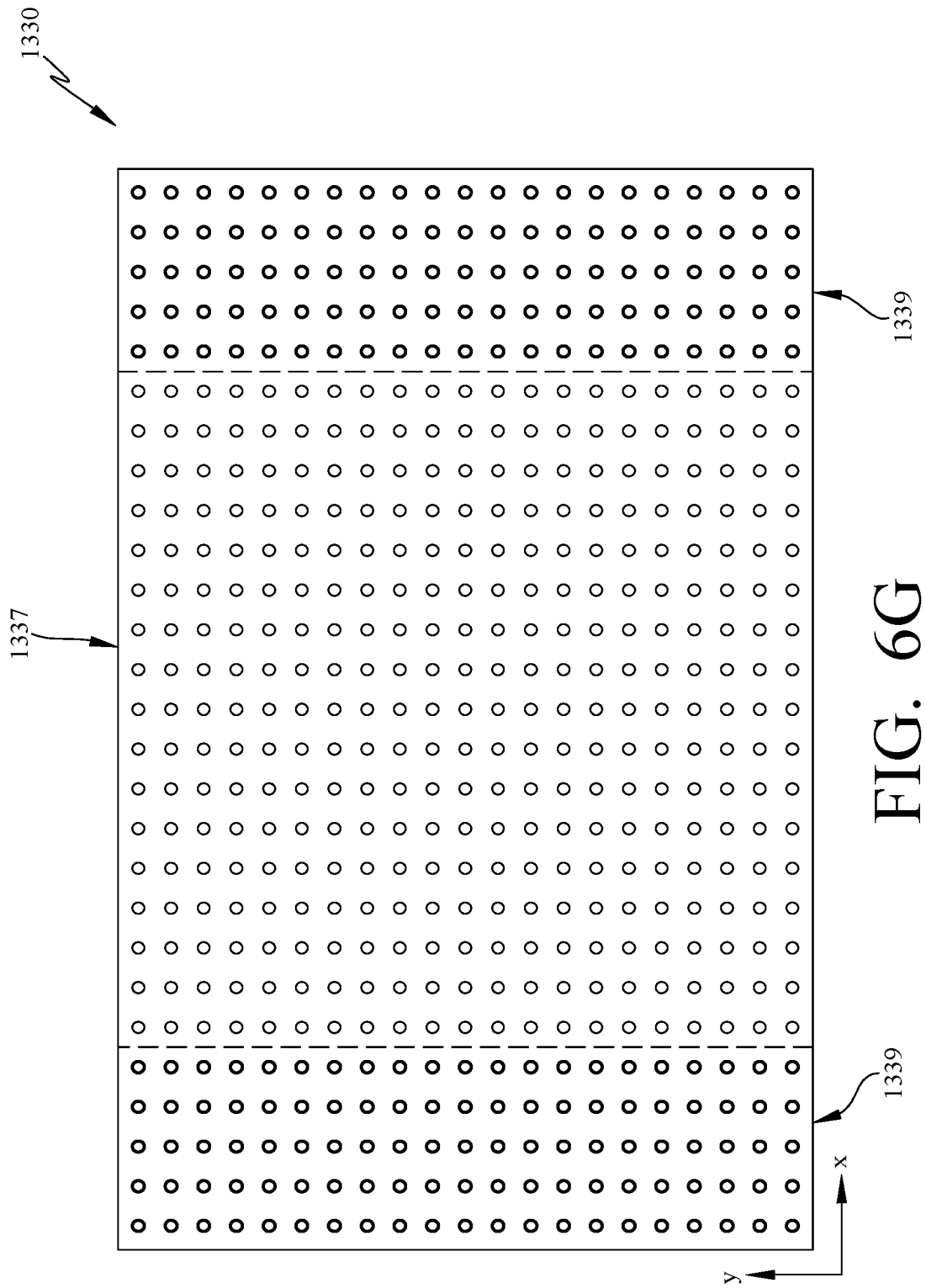
FIG. 6G is a schematic layer view of another exemplary coil pattern for use in a coil panel.
Figure 6H:
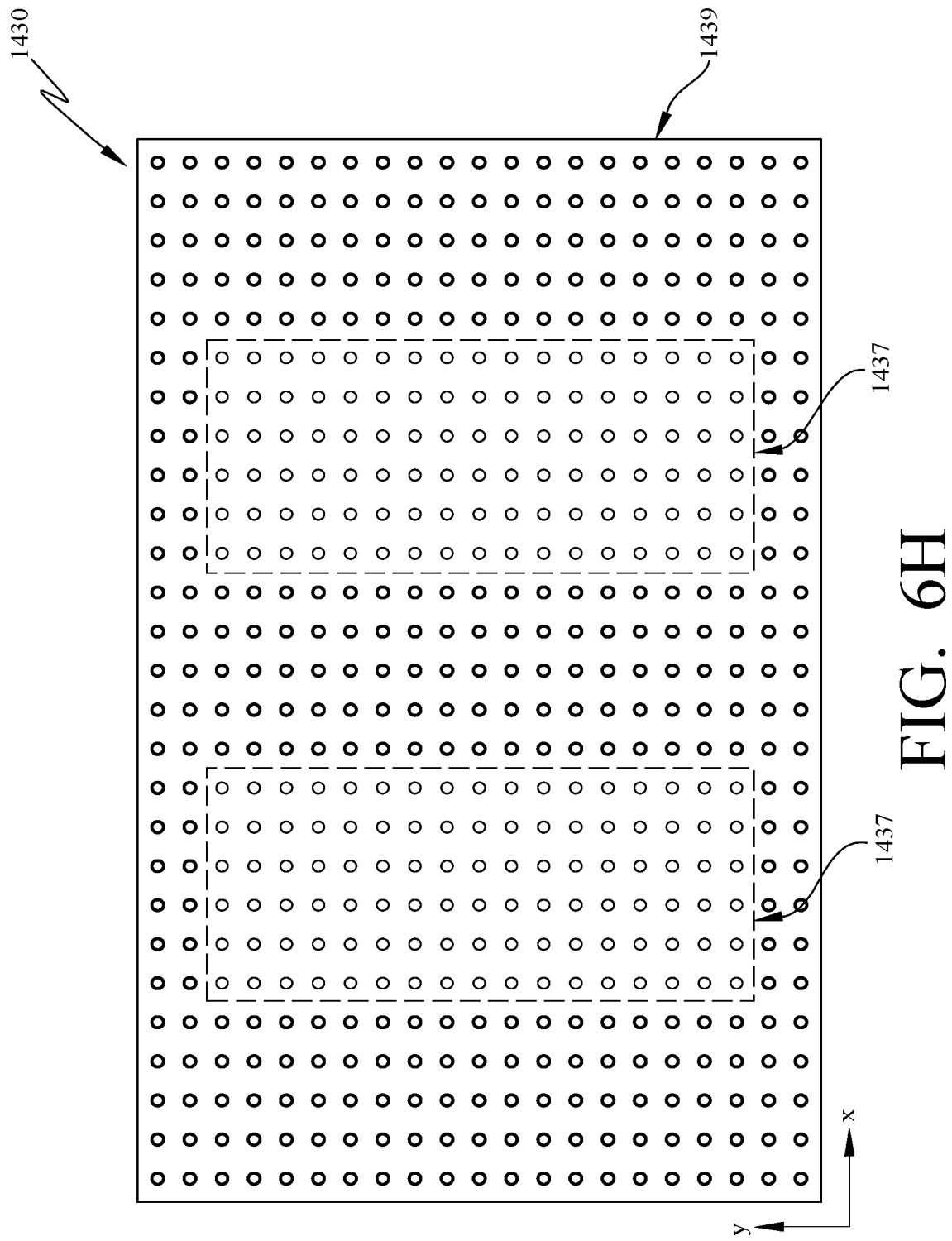
FIG. 6H is a schematic layer view of another exemplary coil pattern for use in a coil panel.

In further embodiments, as depicted in FIGS. 6F-6H, there are different zones in which the configurations of the coils differ. In some instances, these zones may include a soft coil spring zone and firm coil spring zone. Referring specifically FIGS. 6F, the exemplary coil panel 1230 includes a center zone 1237 of coil springs and a perimeter zone 1239 of coil springs, each having coil springs with different configurations and therefore different properties, such as the coil spring's spring constant. As a non-limiting example, a first portion of the plurality of coil springs in the perimeter zones 1239 may be constructed of 17.25 gauge wire resulting in a first spring constant, while a second portion of the plurality of coil springs in the center zone 1237 may be constructed of 19.5 gauge wire resulting in a second spring constant that is different than the first spring constant. Similarly, the perimeter and center coil springs may be pre-loaded differently. As a non-limiting example, the coil springs in the center zone 1237 may have no pre-loading while the coil springs in the perimeter zone 1239 may be preloaded to about 0.09 pound-force to about 0.23 pound-force, and further have a compression at 0.5 inches of about 0.45 pound force to about 0.55 pound force. With reference to FIG. 6G, the exemplary coil panel 1330 includes a middle zone 1337 which may be soft or firm while upper and lower ends or zones 1339 may be the other of soft or firm. With reference to FIG. 6H, the exemplary coil panel 1430 includes a perimeter or edge zone 1439 which is firm and multiple interior zones 1437 that are soft in comparison to the edge zone 1439.

Returning now again to FIGS. 2 and 2A, as previously described, the peripheral edge 39 of the first and second coil panels 30, 32 are joined so as to define a gap 40 between the first and second panels 30, 32 with the support material 42 positioned therein. In the instant embodiment, the support material 42 includes a foam plate 43 disposed within the gap 40. The foam plate 43 may be formed of various materials including, but not limited to, viscoelastic foam (sometimes referred to as "memory foam" or "low resilience foam"). In other embodiments, as will be described further herein, a latex foam may be utilized or reticulated non-viscoelastic foam may be used.

Various foams may be utilized throughout the various embodiments and the following summary is non-exhaustive. For example, open-celled non-reticulated viscoelastic foam may be used. In some embodiments, foams which are temperature responsive may be used. A temperature responsiveness in a range of a user's body temperatures (or in a range of temperatures to which the pillow 10 is exposed by contact or proximity to a user's body resting thereon) can provide significant advantages. As used herein and in the appended claims, a material is considered "responsive" to temperature changes if the material exhibits a change in hardness of at least 10% measured by International Organization for Standardization (ISO) Standard 3386 through the range of temperatures between 10 and 30 degrees Celsius. In other embodiments, it may be desirable that the foam be substantially insensitive to temperature. As used herein, a material is "substantially insensitive" to temperature changes if the material exhibits a change in hardness of less than 10% measured by ISO Standard 3386 through the range of temperatures between 10 and 30 degrees Celsius. In some embodiments, a flexible polyurethane foam may be used and, in some embodiments, a reticulated foam may be utilized.

The support material 42 may be comprised of any of the various mentioned flexible foams which capable of distributing pressure from a user's body or portion thereof across the pillow 10. In some illustrative embodiments, the density of the flexible foam used in the outer portion, typically has a density sufficient for supporting the neck and shoulders of a user. Such flexible foams may include, but are not limited to, latex foam, reticulated or non-reticulated viscoelastic foam (sometimes referred to as memory foam or low-resilience foam), reticulated or non-reticulated non-viscoelastic foam (sometimes referred to as "conventional" foam), polyurethane high-resilience foam, expanded polymer foams (e.g., expanded ethylene vinyl acetate, polypropylene, polystyrene, or polyethylene), and the like. In the embodiment shown in FIG. 2, the foam plate 43 is comprised of a viscoelastic foam that has a low resilience as well as a sufficient, density and hardness, which allows pressure to be absorbed uniformly and distributed evenly across the foam plate 43 of the pillow 10. Generally, such viscoelastic foams have a hardness of at least about 10 N to no greater than about 80 N, as measured by exerting pressure from a plate against a sample of the material to a compression of at least 40% of an original thickness of the material at approximately room temperature (i.e., 21° C. to 23° C.), where the 40% compression, is held for a set period of time as established by the International Organization of Standardization (ISO) 2439 hardness measuring standard. The exemplary foam plate 43 is comprised of viscoelastic foam with a density of about 70 kg/m$^3$ to about 110 kg/m3 and a hardness of about 25 N to about 50 N. In some other exemplary embodiments, the viscoelastic foam has a hardness of about 10 N, about 20 N, about 30 N, about 40 N, about 50 N, about 60 N, about 70 N, or about 80 N to provide a desired degree of comfort and body-conforming qualities.

The viscoelastic foam described herein for use in the pillow 10 may also have a density that assists in providing a desired degree of comfort and body-conforming qualities, as well as an increased degree of material durability. In some embodiments, the density of the viscoelastic foam used in the foam plate 43 has a density of no less than about 30 kg/m$^3$ to no greater than about 150 kg/m$^3$. In some embodiments, the density of the viscoelastic foam used in the foam plate 43 of the pillow 10 is about 30 kg/m$^3$, about 40 kg/m$^3$, about 50 kg/m$^3$, about 60 kg/m$^3$, about 70 kg/m3 about 80 kg/m$^3$, about 90 kg/m$^3$ about 100 kg/m$^3$, about 110 kg/m$^3$ about 120 kg/m$^3$, about 130 kg/m$^3$ about 140 kg/m$^3$, or about 150 kg/m$^3$. Of course, the selection of a viscoelastic foam having a particular density will affect other characteristics of the foam, including its hardness, the manner in which the foam responds to pressure, and the overall feel of the foam, but it is appreciated that a viscoelastic foam having a desired density and hardness can readily be selected for a particular application as desired.

Further, it is also contemplated that while the exemplary foam plate 43 is generally flat in shape, in other embodiments the surface may be may be planar or may be other shapes. For example, in other embodiments, the top and bottom surfaces of the foam plate can be non-planar, including without limitation, surfaces having ribs, bumps, and other protrusions of any shape and size, surfaces having grooves, dimples, and other apertures that extend partially through, nearly completely or entirely through the foam plate.

Regardless of the particular material of the foam plate 43, in some embodiments the foam plate 43 may, or may not, be covered with a netting material (not shown). The netting material may be any textile in which the yarns or fibers are fused, looped or knotted at their intersections, resulting in a fabric with open spaces between the yarns or fibers. Depending on the type of yarn or filament that is used to make up the textile, its characteristics can vary in durability. The netting material may be formed of single knit jersey, double knit jersey, double rib knit, may be made of fire resistant or non-fire-resistant textiles and may have a porosity of from about 50 to about 850 CFM. The fire-resistant textiles may include, for non-limiting example, fire resistant rayon, modified acrylics, Kevlar, nomax and others. Non-fire-resistant textiles may include, for non-limiting example, untreated polyester, rayon, or cotton.

Figure 7C:
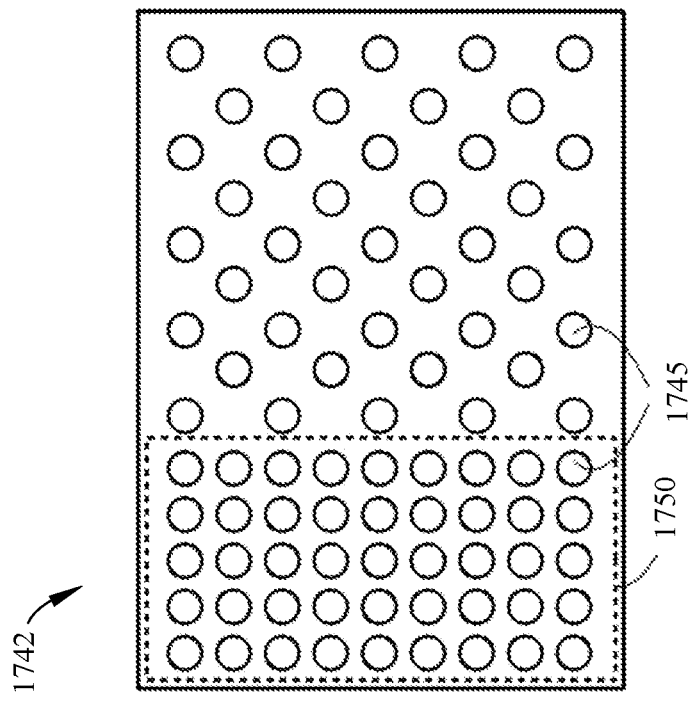
FIG. 7C is a top view of another exemplary foam plate defining a plurality of apertures in a third pattern.
Figure 7A:
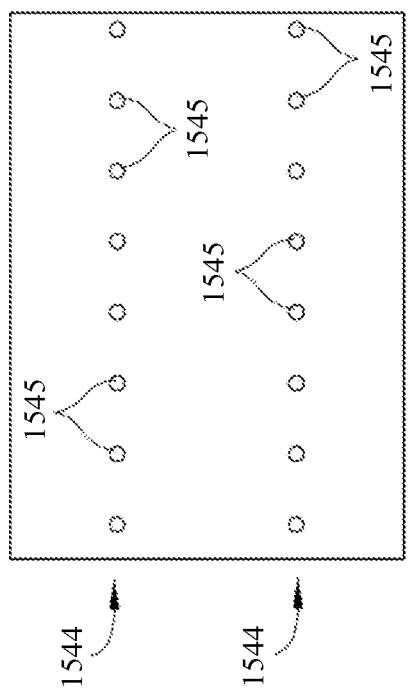
FIG. 7A is a top view of an exemplary foam plate defining a plurality of apertures in a first pattern.
Figure 7B:
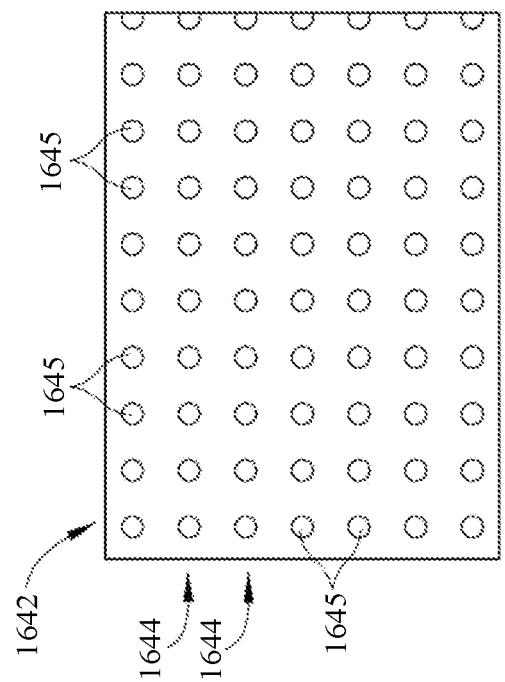
FIG. 7B is a top view of another exemplary foam plate defining a plurality of apertures in a second pattern.

Referring now to FIGS. 7A-C, additional embodiments of a support material 1542, 1642, 1742 made in accordance with the present invention are depicted. These exemplary support materials are foam plates, similar to the exemplary foam plate 43 described above with respect to FIG. 2, and can be used as such in the exemplary pillow 10. In these embodiments, however, the support materials 1542, 1642, 1742 are provided with holes or apertures to allow enhancement of airflow and cooling within the pillow 10. The number of holes or apertures may vary depending upon the amount of airflow desired and the characteristics of the foam or latex. In the exemplary support material 1542 shown in FIG. 7A, two rows 1544 of apertures 1545 are provided in the non-limiting example. However, in exemplary support material 1642 shown in FIG. 7B, the number of rows 1644 and number of apertures 1645 increases which may be characteristic of the foam, the thickness thereof, the density of the foam, and the amount of airflow that may move through the foam without apertures. For example, a thicker foam or a denser foam may have minimal airflow without the apertures, and thus may require more apertures than a thin or less dense foam. Additionally, as compared to the apertures 1545 in the support material 1542 shown in FIG. 7A, the apertures 1645 in the support material 1642 of FIG. 7B are of a larger size. Stated otherwise, the support materials of the present invention may be foam plates have density that ranges from about 1.1 to about 6.7 lb/ft$^3$ and/or may have hole sizes that vary. It may be desirable to provide increased airflow wherein the number of apertures may be increased or the size may be increased. This may also result in a softer support material. Alternately, if less airflow is desired, the number of apertures may be reduced, which may also result in a firmer support material. As illustrated in the exemplary support material 1742 shown in FIG. 7C, there may be a higher density of apertures 1745 in a first region 1750 as compared to the remainder of the support material 1742. In some instances, this first region 1750 may correspond to a feet region of the mattress; however, this is not to be understood as limiting as there could be a higher concentration of apertures associated with particular regions of the pillow. In other implementations, there may be a higher concentration of apertures along a perimeter of the support material, or alternatively there may be a higher concentration of apertures within the center of the support material. Furthermore, the disposition and concentration of the apertures may vary based on the intended use; for example, the location, concentration, and/or size of the apertures may vary depending on whether the pillow is for a side sleeper, a back sleeper, and/or a stomach sleeper.

The holes or apertures may also vary in size or shape. Although the apertures 1545, 1645, 1745 shown in FIGS. 7A-7C are all circular, this is not to be understood as limiting. In some implementations, the apertures may be other shapes such as hexagonal, octagonal, square, triangular, or any shape aperture allowing airflow there through. Similarly, the size (e.g. diameter) of the apertures may also vary. For example, the diameter of the apertures may vary from about ⅛ inch to about 1 inch. In some implementations, all of the apertures may be the same size; while in other implementations, the apertures may vary in size across the support material. For example, the apertures may be larger along a perimeter of the support material or alternatively the apertures may be larger in the center of the support material. In other instances, there may be a non-symmetric distribution of the apertures of various sizes.

Returning once again to FIG. 2, as previously mentioned, an insulator layer 50 is disposed on the both the outer surface of the first coil panel 30 and the outer surface of the second coil panel 32. In other embodiments, however, an insulator layer 50 may only be disposed over the outer surface of either the first coil panel 30 or the second coil panel 32, or it may be omitted entirely without departing from the spirit and scope of the present invention. The insulator layer 50 may be formed of various materials. In some embodiments, the insulator layer 50 may be a fiber material, a spacer fabric, a foam, or other material which has insulating characteristics. In some instances, the spacer fabric may be formed of a bi-directionally stretched material, meaning it is stretchable in two dimensions, such as the horizontal directions, for example head to toe and laterally, side to side relative to a bed. The spacer fabric may include a woven, or knit material, and/or may include extruded plastic materials including polyethylene, polyester, other plastics or combinations of any of these or others. In some embodiments, the insulator layer 50 may be formed of a non-woven material or a high loft material. The term "non-woven" is used in the textile industry to denote fabrics which are neither woven nor knitted. Non-woven fibers are engineered fibers that are typically manufactured by putting small fibers together in the form of a sheet or web, and then bonding them together by chemical, mechanical, heat or solvent treatment. The term "non-densified" refers to fibers which have not bonded to each other through the melting and re-solidification of bonding fibers. "High-loft" is a term given to a fiber structure that contains more air than fiber. In general, high-loft fibers retain more warmth. Such high-loft material is a lofty, low-density material that is used in such applications as fiberfill, insulation, and the like. The fibers may be made of a material have a slick or slippery surface, including but not limited to polyester, polypropylene, nylon, silk, acrylic, acetate and/or rayon. In other instances, the insulator layer 50 may be natural fibers such as wool, down, or the like. In some embodiments, the insulator layer 50 further includes a netter material to contain other loose materials.

Referring still to FIG. 2, as previously mentioned, also shown outwardly of the insulator layer 50 is an outer shell 60, 62. More specifically, a first shell material 60 is positioned by an outer side of the first coil panel 30 and a second shell material 62 is positioned by an outer side of the second coil panel 32. The exemplary first and second shell materials 60, 62 are joined along a periphery of the outer shell 60, 62 to thereby enclose the insulator layers 50 and inner shell 31, but in some embodiments the outer shell 60, 62 may be open along one side, multiple sides, or entirely unjoined. The opening(s) may allow for positioning of the various layers therein and, if desirable, removal at a later time. The first and second shell materials 60, 62 may be joined together by welding, sewing, and/or other forms of fastening to form the outer shell 60, 62.

In the exemplary pillow 10, each of the first and second shell materials 60, 62 are foam panels with the lower first shell material 60 being relatively thick and the upper second shell material 62 being relatively thinner to provide a different feel for the sides of the pillow 10. In the instant example, the outer shell 60, 62 may be formed of any of the previously described foams including, but not limited to, polyurethane foams or latex foams. Further, the upper shell material 62 and lower shell material 60 may be of the same type of foam but may have different characteristics to provide the different feel for the pillow sides in addition to or instead of varying the thickness of the first and second shell materials 60, 62. Of course, the foam characteristics may also be the same for matching feel on both sides of the pillow. Regardless of the particular material of the first and second shell materials 60, 62, in some embodiments, the first and second shell materials 60, 62 may, or may not, be covered with a netting material (not shown). The netting material may be any textile in which the yarns or fibers are fused, looped or knotted at their intersections, resulting in a fabric with open spaces between the yarns or fibers. Depending on the type of yarn or filament that is used to make up the textile, its characteristics can vary in durability. The netting material may be formed of single knit jersey, double knit jersey, double rib knit, may be made of fire resistant or non-fire-resistant textiles and may have a porosity of from about 50 to about 850 CFM. The fire-resistant textiles may include, for non-limiting example, fire resistant rayon, modified acrylics, Kevlar, nomax and others. Non-fire-resistant textiles may include, for non-limiting example, untreated polyester, rayon, or cotton. According to some embodiments, the outer shell 60, 62 may be used in addition to or alternatively to the insulator layer 50 on one or both sides of the inner shell 31.

Referring still to FIG. 2, as previously mentioned, a cover 20 is disposed about the outer shell 60, 62. In the exemplary pillow 10, the cover 20 is made of a fabric, but in other embodiments various materials may be used including, but not limited to, cotton, cotton blends, moisture-wicking fabric, such as 100% polyester fabric, rayon, nylon, or spandex-blend fabric for increased performance and stretch-ability or blends of any of the preceding. This list is non-exhaustive and other materials may be used. The cover 20 fabric may be quilted and/or may include various designs, including but not limited to labels for a "firm" or "soft" side. The cover 20 also defines the outer periphery of the pillow 10 and therefore the shapes of the various layers located within the cover 20, together with the peripheral edge of the cover 20 define the shape of the pillow 10. The cover 20 may also include phase change material in some embodiments in order to enhance cooling feel to the user. If desirable, it is contemplated that a pillow case, typically formed of a thin fabric may be placed over the cover 20. The exemplary cover 20 is closed about the peripheral edge 16 and includes the closure 18 to access the interior of the pillow 10 or alternatively, remove the internal contents for washing of the cover 20 when desired. The closure 18 may extend along one or more sides of the pillow 10 to ease placement of the layers therein.

As previously mentioned, the upper and lower surfaces 12, 14 joined along the peripheral edge 16 may each be utilized by a user on either side by flipping the pillow 10. By adjusting the characteristics of one or more of the components discussed above, the upper and lower surfaces 12, 14 of the pillow 10 may provide different feelings or may provide the same feeling on both sides. For example, one side of an exemplary pillow could be firmer or softer than the other side. Still further, one side of an exemplary pillow may have the same or may have more or less cooling capacity than the other side. An exemplary pillow may also include a gusset (not shown) along the peripheral edge thereof, which allows for a thicker pillow of taller height.

Figure 3:
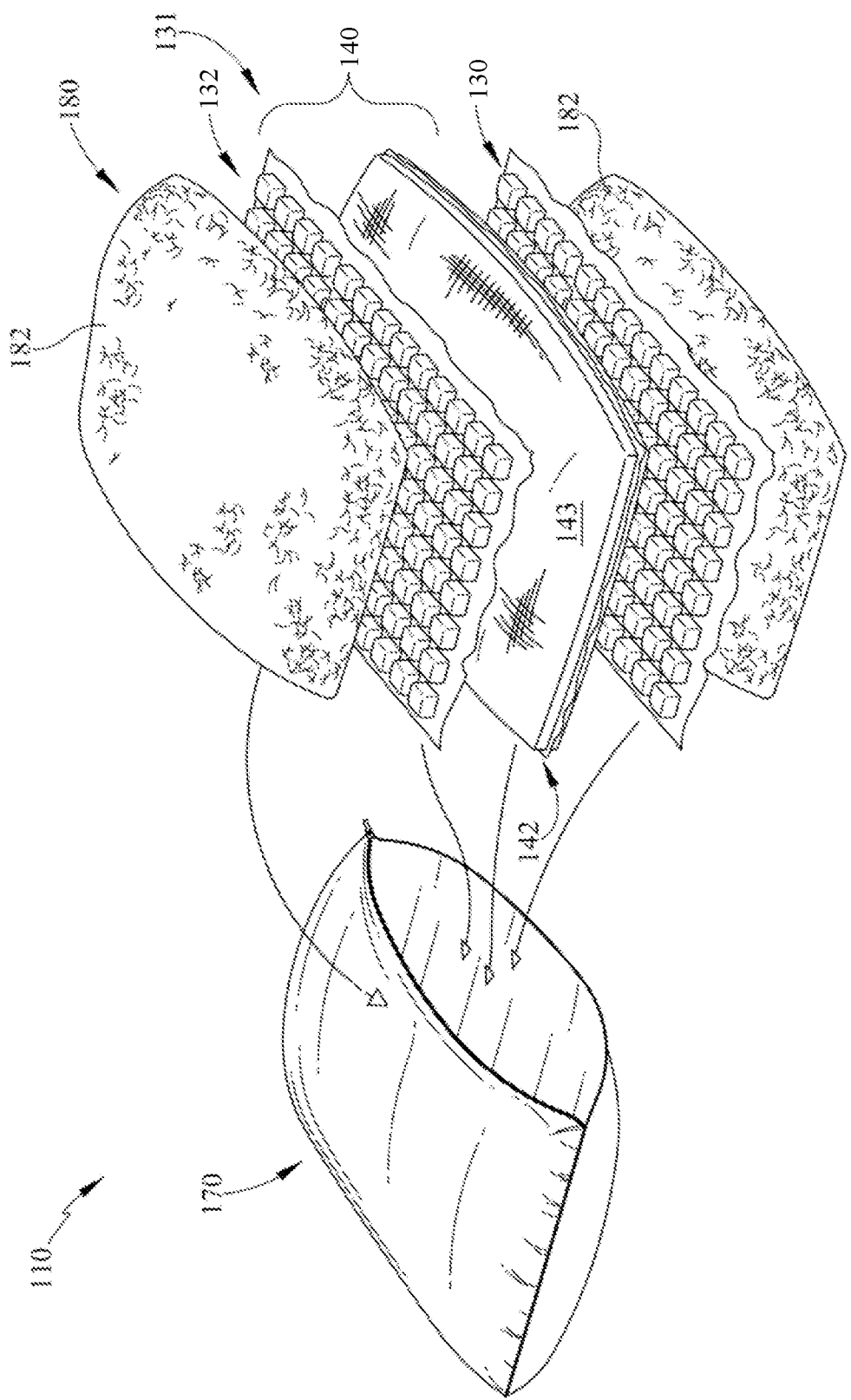
FIG. 3 is an exploded perspective view of another exemplary hybrid pillow made in accordance with the present invention.

Referring now to FIG. 3, another exemplary pillow 110 made in accordance with the present invention includes first and second coil panels 130, 132 substantially similar to the first and second coil panels 30, 32 described above with respect to FIGS. 2-2A with a gap 140 defined between the first and second coil panels 130, 132 and a support material 142 disposed in the gap 140. However, in the exemplary pillow 110 shown in FIG. 3, the support material 142 includes a latex plate 143 as compared to the foam plate 43 made of a viscoelastic foam described above with reference to FIG. 2. The exemplary latex plate 143 may additionally have other additives to improve performance relative to moisture, smells, or other characteristics which may sometimes be unpleasant. Furthermore, the latex plate 143 may, or may not, also be surrounded by a netting material (not shown) in order to help reduce sliding, sticking, bunching, or the like between adjacent layers.

The exemplary pillow 110 also includes an outer shell 180 made of a down-filled fabric shells 182, which include a down-proof material on an interior surface thereof and may be sealed closed or may include a closure to allow removal of the down. Similar to the exemplary pillow 10 shown in FIG. 2, the pillow 110 shown in FIG. 3 also include a cover 170, in addition to the down filled fabric shell.

Also similar to the pillow 10 described above with reference to FIGS. 2-2A, in this embodiment, there is an outer shell 180 defined by the down-filled fabric shells 182 and an inner shell 131 formed by the first and second coil panels 130, 132 which are joined along their periphery. Thus a similar outer shell and inner shell arrangement is provided as described above.

Figure 4:
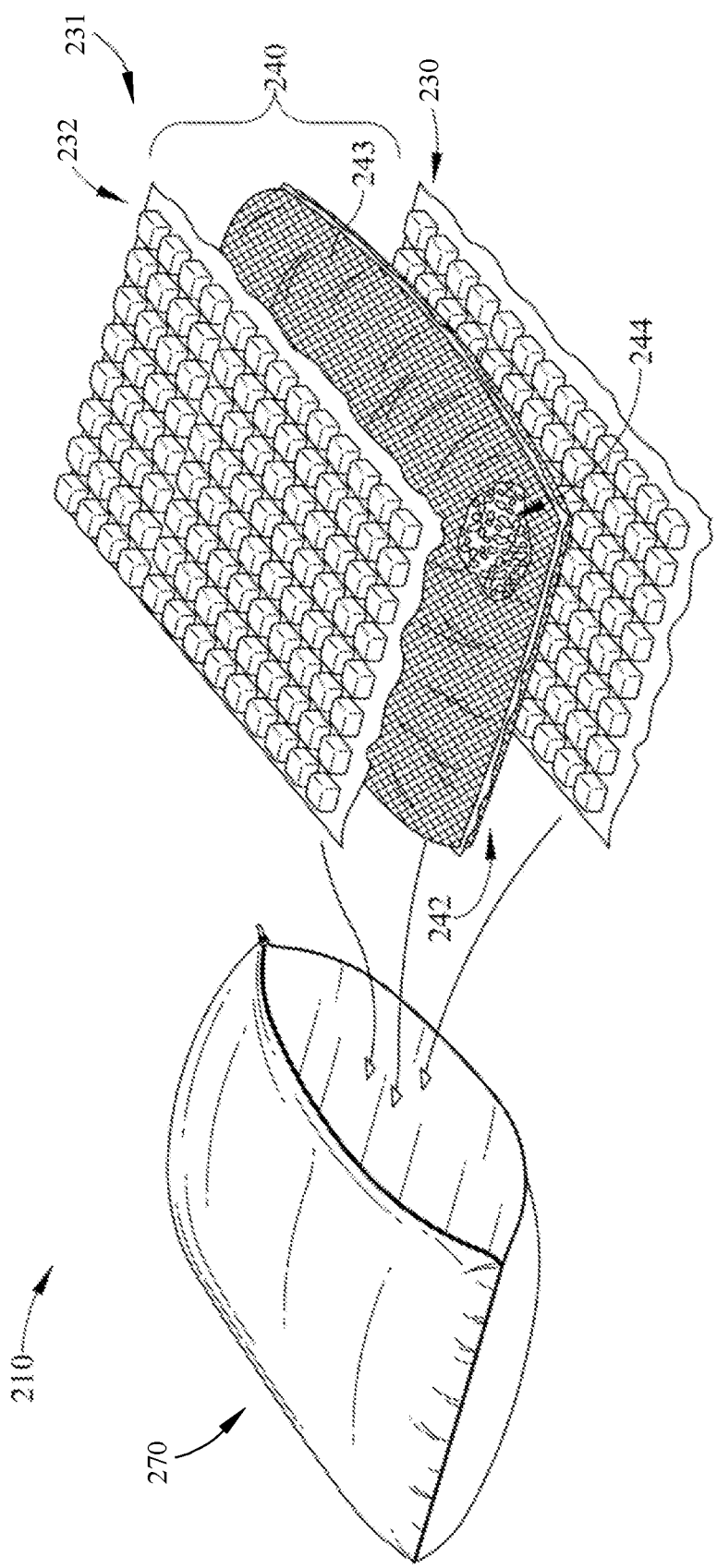
FIG. 4 is an exploded perspective view of yet another exemplary hybrid pillow made in accordance with the present invention.

Referring now to FIG. 4, another exemplary pillow 210 made in accordance with the present invention includes first and second coil panels 230, 232 substantially similar to the first and second coil panels 30, 32 described above with respect to FIGS. 2-2A with a gap 240 defined between the panels 230, 232 and a support material 242 disposed in the gap 140. However, in the exemplary pillow 210 shown in FIG. 4, the support material 242 includes a netting material 243 which is filled with chipped cushion material 244, such as chipped foam or chipped latex. In contrast with the previous embodiments, which utilized continuous foam or latex plate structures, the instant embodiment utilizes the chipped cushion material to provide a further different feel for the pillow 210. The chipped cushion material 244 may be sized in the range of about ¼ inch to about 1½ inches and may be of a consistent firmness, or may contain foam of varying firmness.

Furthermore, unlike the previous pillows 10, 110, in the exemplary pillow 210 shown in FIG. 4, the cover 270 is positioned immediately around the inner shell 231 formed by the first and second coil panels 230, 232. Accordingly, in this exemplary embodiment, the cover 270 itself can be considered an outer shell.

Each of the above described exemplary pillows may additionally include additives such as copper to improve the characteristics relative to moisture content and inhibition of mold growth. Other additives may be provided to improve fire retardants or improve the smell of the foam, such as carbon or charcoal additives for filtration. Other additives, for example, graphite, aluminum, silver, charcoal, gel, and others can also be included for a variety of benefits known in the art. Further additions to the exemplary pillows can provide far infrared radiation for rejuvenating properties. Still further, on or more layers of the pillow may be coated with nanobionic materials or phase change materials (PCM) to enhance a cooling feel to the user. These phase change materials (PCM) may be coatings, including but not limited to, commercially available organic, inorganic, solid and biological materials. Additionally, one or more layers may further include biocides, preservatives, odor blocking agents, scents, pigments, dyes, stain guards, antistatic agents, anti-soiling agents, water-proofing agents, moisture wicking agents, and the like, as are known in the art.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A hybrid pillow, comprising:
    a first coil panel formed of a plurality of coil springs, an upper fabric layer, and a lower fabric layer, the upper fabric layer and the lower fabric layer joined between the plurality of coil springs and along peripheral edges of the first coil panel;
    a second coil panel formed of a second plurality of coil springs, a second upper fabric layer, and a second lower fabric layer, the second upper fabric layer and the second lower fabric layer joined between the plurality of coil springs and along peripheral edges of the second coil panel;
    the first coil panel and the second coil panel joined along the peripheral edges to form an inner shell defining a gap therebetween, the first coil panel and/or the second coil panel configured to be preloaded a desired amount to tune a firmness of the first coil panel and/or the second coil panel; and
    an insulator layer extending along an outside surface of the first coil panel, an outside surface of the second coil panel, or outside surfaces of each of the first coil panel and the second coil panel.

2. The hybrid pillow of claim 1, further comprising a support material disposed in the gap of the inner shell.

3. The hybrid pillow of claim 1, further comprising one or more additional layers disposed about the inner shell.

4. The hybrid pillow of claim 1, wherein the one or more additional layers includes:
   an outer shell formed of a first shell material positioned by an outer side of the first coil panel and a second shell material positioned by an outer side of the second coil panel, the first shell material and the second shell material joined along a periphery of the outer shell and enclosing the inner shell; and
   a cover disposed about the outer shell.

5. The hybrid pillow of claim 1, wherein the first coil panel and/or the second coil panel are joined to the insulating layer by a length of cord.

6. The hybrid pillow of claim 1, wherein the length of cord is adjustable to increase or decrease the firmness of the first coil panel and/or the second coil panel.

7. The hybrid pillow of claim 1, wherein the insulator layer is formed of fiber material, a foam material, or a combination thereof.

8. The hybrid pillow of claim 1, wherein the insulator layer includes a netting material.

9. The hybrid pillow of claim 1, wherein the first shell material and the second shell material are formed of foam.

10. The hybrid pillow of claim 4, wherein the first shell material and the second shell material include down.

11. The hybrid pillow of claim 10, wherein the first shell material and the second shell material further include a down-proof material.

12. The hybrid pillow of claim 2, wherein the support material is a foam plate.

13. The hybrid pillow of claim 12, wherein the support material is formed of polyurethane foam or latex foam.

14. The hybrid pillow of claim 13, wherein the polyurethane foam is a viscoelastic foam.

15. The hybrid pillow of claim 12, wherein the foam plate defines a plurality of apertures.

16. The hybrid pillow of claim 2, wherein the support material includes a netting material filled with chipped cushion material.

17. The hybrid pillow of claim 1, wherein at least one of the first upper fabric layer, the second upper fabric layer, the first lower fabric layer, and the second lower fabric layer defines a plurality of apertures.

18. The hybrid pillow of claim 1, wherein at least one of the first coil panel and the second coil panel includes a first portion of the plurality of coil springs with a first spring constant, and a second portion of the plurality of coil springs with a second spring constant that is different than the first spring constant.

19. The hybrid pillow of claim 1, wherein at least one of the first shell material and the second shell material is covered by a netting material.

20. A hybrid pillow, comprising:
   a first coil panel formed of a plurality of coil springs, an upper fabric layer, and a lower fabric layer, the upper fabric layer and the lower fabric layer joined between the plurality of coil springs and along peripheral edges of the first panel, wherein the upper and lower fabric layers define a plurality of apertures;
   a second coil panel formed of a second plurality of coil springs, a second upper fabric layer, and a second lower fabric layer, the second upper fabric layer and the second lower fabric layer joined between the second plurality of coil springs and along peripheral edges of the second panel, wherein the second upper and second lower fabric layers define a plurality of apertures;
   the first coil panel and the second coil panel joined along the peripheral edges and defining a gap therebetween, and the first coil panel and/or the second coil panel configured to be preloaded a desired amount to tune a firmness of the first coil panel and/or the second coil panel;
   a support material formed of polyurethane or latex disposed in the gap between the first panel and the second panel; and
   an insulator layer extending along an outside surface of the first coil panel, an outside surface of the second coil panel, or outside surfaces of each of the first coil panel and the second coil panel.

* * * * *